United States Patent [19]
Kaplinsky

[11] Patent Number: 5,726,583
[45] Date of Patent: Mar. 10, 1998

[54] PROGRAMMABLE DYNAMIC LINE-TERMINATION CIRCUIT

[76] Inventor: Cecil H. Kaplinsky, 140 Melville Ave., Palo Alto, Calif. 94301

[21] Appl. No.: 690,227

[22] Filed: Jul. 19, 1996

[51] Int. Cl.[6] ............................................. H03K 19/0175
[52] U.S. Cl. ................................................. 326/30; 326/86
[58] Field of Search ........................... 326/30, 86; 1/17, 1/27, 121, 83

[56] References Cited

U.S. PATENT DOCUMENTS

| | | | |
|---|---|---|---|
| 4,859,877 | 8/1989 | Cooperman et al. | 326/30 |
| 5,164,663 | 11/1992 | Alcorn | 324/158 R |
| 5,287,022 | 2/1994 | Wilsher . | |
| 5,329,190 | 7/1994 | Igarashi et al. . | |
| 5,343,503 | 8/1994 | Goodrich | 375/121 |
| 5,361,038 | 11/1994 | Allen et al. | 330/54 |
| 5,444,406 | 8/1995 | Horne | 327/277 |
| 5,479,123 | 12/1995 | Gist et al. | 327/108 |
| 5,528,166 | 6/1996 | Iikbahat | 326/30 |
| 5,530,377 | 6/1996 | Walls | 326/30 |

OTHER PUBLICATIONS

Chris Hanke et al., "Low Skew Clock Drivers and their System Design Considerations", *Motorola Application Note AN1091*, 1990.

Michael Dolle, "A Dynamic Line–Termination Circuit for Multireceiver Nets", *IEEE Journal on Solid–State Circuits*, vol. 28, No. 12, pp. 1370–1373, Dec. 1993.

*Primary Examiner*—Jon Santamauro
*Attorney, Agent, or Firm*—Thomas Schneck; Mark Protsik

[57] ABSTRACT

A dynamic termination circuit is disclosed that has a plurality of parallel termination elements that respond successively to a signal transition and which are selectively enabled and disabled to provide a desired impedance match with a transmission line. Each termination element includes a first dynamic resistive path between a voltage supply line and that termination element's output and a second dynamic resistive path between the termination element output and ground, both resistive paths including field-effect transistors whose control gates are responsive to a signal received from the transmission line via an input to the circuit. For successive response, a series of delay elements are provided between the circuit input and the respective termination circuit elements. For selective enablement, logic gates connected between the termination element inputs and the field-effect transistor control gates have enable inputs receiving user-programmable enable signals for the respective termination elements. In addition to the impedance provided by the main dynamic resistive paths to voltage supply and ground, at least one of the termination elements may have supplemental dynamic resistive paths in parallel with the main paths and responsive to a TRIM bit to allow adjustment of the actual impedance to manufacturing tolerances.

15 Claims, 3 Drawing Sheets

PROGRAMMABLE DYNAMIC LINE-TERMINATION CIRCUIT

TECHNICAL FIELD

The present invention relates to bus or line termination circuitry for minimizing switching noise or "ringing" on signal lines, such as clock distribution traces on a printed circuit board, by reducing signal reflection, i.e., feedback, at the ends of such lines.

BACKGROUND ART

At the rapid switching speeds and edge rates of modern high speed circuits, as, for example, with the 100 MHz or higher frequency clock signals provided by modern clock drivers, an unterminated line will exhibit substantial voltage overshoot and undershoot, i.e. switching noise, following a transition due to signal reflections going back and forth along the line. Accordingly, it is well understood that a well designed circuit will include some form of termination circuitry to more closely match the lines to their associated source and load impedances so as to minimize the signal reflections. Motorola Application Note AN1091, entitled "Low Skew Clock Drivers and their System Design Considerations", by Chris Hanke and Gary Tharalson (1990), describes a number of common termination schemes for transmission lines and discusses their advantages and disadvantages relative to their use in terminating clock lines. The disclosed techniques include series, parallel, Thevenin, and AC termination. One important consideration in evaluating these various schemes is power dissipation. Series termination does not create a DC current path to Vcc or ground and thus has minimum power dissipation, but is really only effective when a single load is lumped at the end of the transmission line. Parallel termination, with its resistive path to ground, dissipates considerable power when the output is high and the driver will need to be able to provide a large amount of current (typically on the order of about 100 mA) to maintain the line at the high voltage level (e.g., 5 V). Thevenin termination, with two resistors tied to Vcc and ground, respectively, uses less power, since the resistances in each path are at least twice as large as in parallel termination, but is less suitable for CMOS circuits, which need to be driven from rail to rail to avoid current leakage in a receiver's input inverter. AC termination, with its capacitor acting to block DC current flow to ground, is best with respect to power dissipation and effectiveness. However, the RC time constant of the terminator circuit must be greater than twice the loaded line delay, and thus requires capacitances (on the order of 0.1 µF or greater) that are difficult to make in an integrated technology.

Michael Dolle in an article entitled "A Dynamic Line-Termination Circuit for Multireceiver Nets", in IEEE Journal of Solid State Circuits, vol. 28, no. 12, December 1993, pages 1370 to 1373, and Igarashi et al., in U.S. Pat. No. 5,329,190, both describe the concept of dynamic termination. This type of termination circuit uses only AC power and can be formed with integrated solid state technology. The circuit described in the Igarashi patent is reproduced here in FIG. 1. A transmission line 11, such as a conductive trace on a printed circuit board, is connected to a driver, such as a high frequency, low skew clock driver, comprised of a digital signal source 13 and characterized by an output impedance 15. One or more receiver circuits, not shown, are connected at various points along the transmission line 11, which is thus characterized by a loaded impedance value $Z_0$. The termination circuitry is connected to the far end 17 of the transmission line 11. The circuit includes a first p-channel field-effect transistor M1 connected in series with a first resistor R1 between a power supply line $V_{dd}$ and a feedback node 27, and a second n-channel field-effect transistor M2 connected in series with a second resistor R2 between the feedback node 27 and ground. The gates of the two transistors M1 and M2 are driven by the outputs 23 and 24 of inverters 21 and 22 whose inputs 19 and 20 are connected to the transmission line end 17. A feedback path 29 connects the node 27 to the inputs 19 and 20 of the inverters 21 and 22, effectively creating a latch. Note that Dolle discloses an alternative circuit in which a single inverter drives both transistors M1 and M2. For effective signal termination, the sum of the resistance of R1 and the impedance of M1 when saturated is equal to the characteristic impedance $Z_0$ of the transmission line 11. Likewise, the sum of the resistance of R2 and the impedance of M2 when saturated is also equal to $Z_0$. Because the impedances of transistors M1 and M2 change with the change in drain-to-gate voltage, the resistors R1 and R2 are made to provide most of the termination impedance in order to obtain excellent linearity. For example, if the characteristic line impedance $Z_0$ is 50 Ω, the resistors R1 and R2 might each be given a resistance of about 45 Ω, while transistors M1 and M2 merely have the balance of the resistance of 5 Ω when saturated. Dolle's circuit places a single resistor in the feedback path 29 instead of the pair of resistors R1 and R2. However, Igarashi's placement of the resistors R1 and R2 in the current path between $V_{dd}$ and ground substantially reduces the crossover current during switching.

While this dynamic termination circuit is a considerable improvement over prior termination schemes, and undershoot and overshoot on the transmission line 11 is much reduced, there is still room for improvement in a number of important areas. In order to further reduce the undershoot and overshoot, it would appear necessary to slow down the transition of the inverter outputs 23 and 24 driving the transistors M1 and M2. Then the impulse provided at the end 17 of the transmission line will be reduced. However, this means there will be increased power consumption due to the longer transition period. Thus, a tradeoff between noise reduction and power dissipation would seem to be inevitable. Second, a simulation of the dynamic termination circuit shows that the reduction or elimination of ringing provided by the line termination depends upon the driver, the length of the transmission line, the way the loads are distributed along the transmission line, and the manufacturing process variations in making the terminator circuit. Since the driver and receiver loads are not generally known in advance, it would appear to be necessary to provide a wide selection of different terminator circuits to cover all of the possible line impedance values $Z_0$.

An object of the present invention is to provide a termination circuit which provides improved noise reduction without increasing power dissipation, and which is usable for a wide range of termination impedances.

DISCLOSURE OF THE INVENTION

The object is met in the present invention by providing a plurality of parallel high impedance termination elements that together produce an overall desired impedance, and by a series of delay elements connected to the inputs of the termination elements to cause the termination elements to switch at different times. This allows each termination element to switch rapidly for minimum power dissipation, while slowly transitioning the termination output from low-to-high or high-to-low in response to a corresponding change on the transmission line.

The object is also met by providing means for enabling and disabling selected termination elements to programmably set the final overall impedance value of the circuit. Further, a trimming circuit is also included to modify the overall impedance value within the manufacturing tolerance of the termination circuit. These programmable elements of the circuit allow the actual termination impedance to be matched closely to the characteristic impedance of the transmission line with greater accuracy.

BEST MODE FOR CARRYING OUT THE INVENTION

Figure 1:
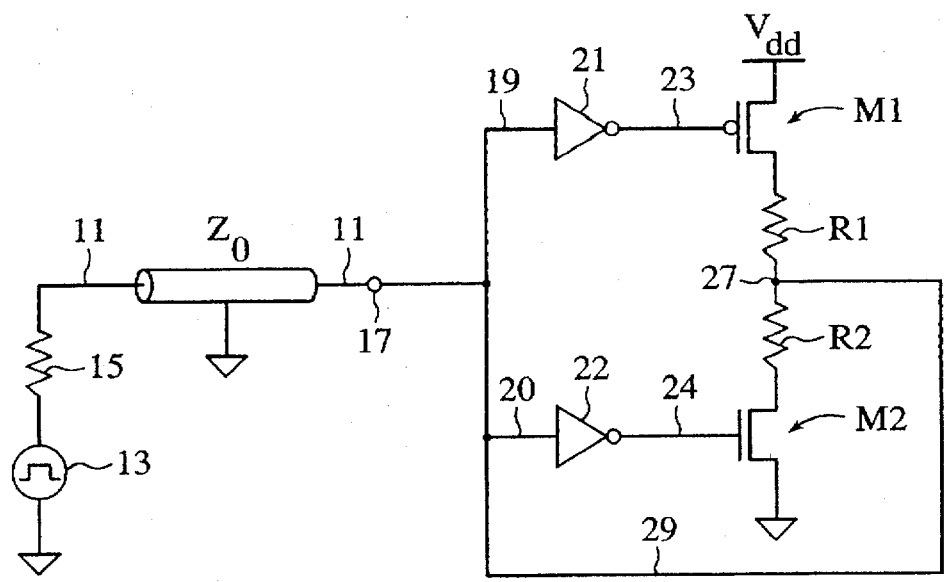
FIG. 1 is a schematic circuit diagram of a prior art dynamic termination circuit.
Figure 2:
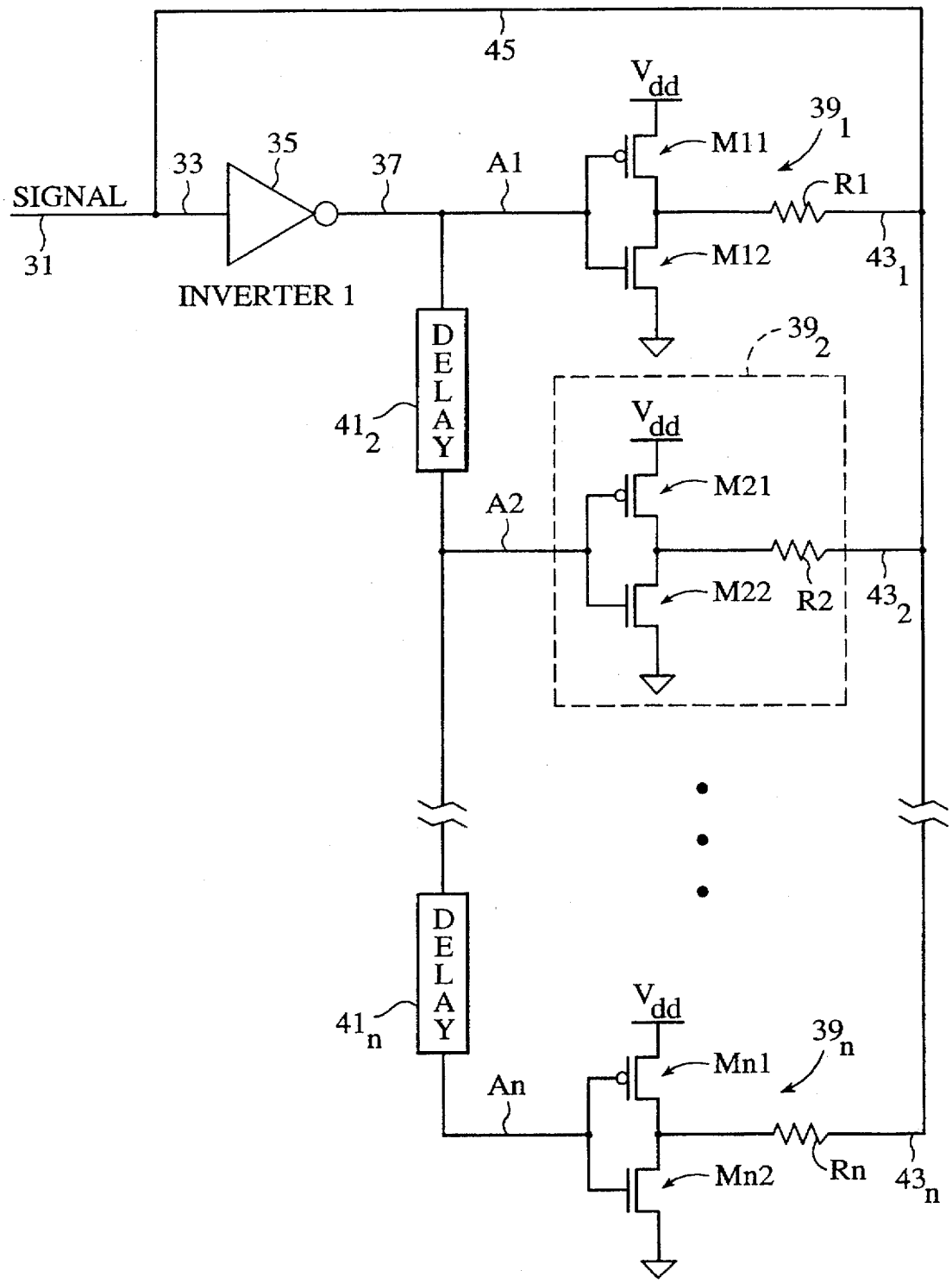
FIG. 2 is a schematic circuit diagram of an embodiment of the termination circuit of the present invention.

With reference to FIG. 2, a termination circuit of the present invention includes a terminator input 31 connected to an end of a transmission line in the same manner as the prior art circuit in FIG. 1 to receive an input signal. An input 33 of an inverter 35 connects to the terminator input 31 and provides an inverted output 37. The termination circuit also includes a plurality of high impedance termination elements $39_1, 39_2, \ldots, 39_n$ connected in parallel to the inverter output 37. All of the termination elements, except the first element $39_1$, are indirectly connected to the inverter output 37 through a series of delay elements $41_2, \ldots, 41_n$. These delay elements are preferably formed by resistors of about 1200 Ω each that, in combination with the capacitance of the transistors of the respective termination elements, form an RC delay chain for the inverter output signal. The inverter output 37 provides an undelayed signal A1 driving the first termination element $39_1$, a once delayed signal A2 through delay element $41_2$ for driving the second termination element $39_2$, a twice delayed signal through two successive delay elements for driving a third termination element, and so on, up to a (n−1)-times delayed signal An through (n−1) successive delay elements $41_2, \ldots, 41_n$ for driving the nth termination element $39_n$. The number of termination elements $39_1, \ldots, 39_n$ may range from as few as two to as many as about 16 or 20, but typically number about 8 to 12. The total accumulated delay for the nth termination element (i.e., through all (n−1) delay elements $41_2, \ldots, 41_n$) is approximately 27 ns. When the resistance of each delay element $41_2, \ldots, 41_n$ is the same, the delay contribution gets successively smaller for each delay element in the series. If desired, the delay resistances could be varied to provide constant time delay increments from one delay element to the next. The outputs $43_1, 43_2, \ldots, 43_n$ from each termination element $39_1, 39_2, \ldots, 39_n$ are connected to a feedback line to the input 33 of the inverter 35, forming a latch.

Each termination element $39_1, 39_2, \ldots, 39_n$ in FIG. 2 comprises a p-channel pull-up field-effect transistor M11, M21, ..., Mn1 connected to a voltage supply line $V_{dd}$ and an n-channel pull-down field-effect transistor M12, M22, ..., Mn2 connected to ground. The undelayed or delayed signal A1, A2, ..., An output from the first inverter 35 (through any number of delay elements $41_2, \ldots, 41_n$) is applied to the gates of these transistors M11, M12, M21, M22, ..., Mn1, Mn2. When the signal on terminator input 31 goes from high to low (or, alternatively, from low to high) and the inverted signals A1, A2, ..., An successively go from low to high (or high to low), the p-channel pull-up transistors M11, M21, ..., Mn1 successively switch off (or switch on) while the n-channel pull-down transistors M12, M22, ..., Mn2 successively switch on (or off), so that the respective outputs $43_1, 43_2, \ldots, 43_n$ of the terminator elements $39_1, 39_2, \ldots, 39_n$ are successively pulled down (or up), gradually changing the termination impedances one-by-one from being connected to voltage line $V_{dd}$ to being connected to ground (or vice versa).

The termination elements $39_1, 39_2, \ldots, 39_n$ include a resistive path through the pull-up transistors to $V_{dd}$ and a resistive path through the pull-down transistors to ground, where most (typically at least 70%) of the impedance of the termination elements is supplied by resistors. In FIG. 2, these resistors R1, R2, ..., Rn are located in the output paths of the termination elements $39_1, 39_2, \ldots, 39_n$ connected between the nodes connecting pull-up transistors M11, M21, ..., Mn1 to pull-down transistors M12, M22, ..., Mn2 and the termination element outputs $43_1, 43_2, \ldots, 43_n$. If ten termination elements $39_1, 39_2, \ldots, 39_n$ are used (i.e., n=10) and the characteristic impedance $Z_0$ of the transmission line is 50 Ω, then the impedance provided by each pull-up or pull-down transistor is typically about 150 Ω and the resistance provided by each of the resistors R1, R2, ..., Rn is typically about 350 Ω, so that the impedance of any one termination element is 500 Ω (i.e., 150 Ω+350 Ω) and of all ten parallel elements in the termination circuit as a whole is 50 Ω, matching that of the transmission line. Alternatively, separate resistors may be provided for the pull-up and pull-down transistors, as seen by the termination element 55i in FIG. 3. There a pull-up transistor Mi1 and a first resistor Ri1 are in series between the voltage supply line $V_{dd}$ and an output node $65_i$, while a pull-down transistor Mi2 and a second resistor Ri2 are in series between the output node 65i and ground. Thus, in addition to the transistors Mi1 and Mi2, two resistors Ri1 and Ri2 are in the current path between $V_{dd}$ and ground, minimizing crossover current when both transistors Mi1 and Mi2 are partially on during a transition. For 10 termination elements and a 50 Ω characteristic impedance of the transmission line, each resistor Ri1 and Ri2 (where i=1 to 10) may have a resistance of about 420 Ω, while each pull-up and pull-down transistor Mi1 and Mi2 (again with i=1 to 10) may have a saturated impedance of 80 Ω. The sizes of the transistors needed to provide this 80 Ω impedance will vary, depending on the particular technology used. For example, with the 0.6 µm CMOS technology used by Atmel Corporation, the p-channel transistors may have a size (channel width/length in micrometers) of 29.5/6.0, while the n-channel transistors may have a size of 13.0/0.6.

Figures 3, 4:
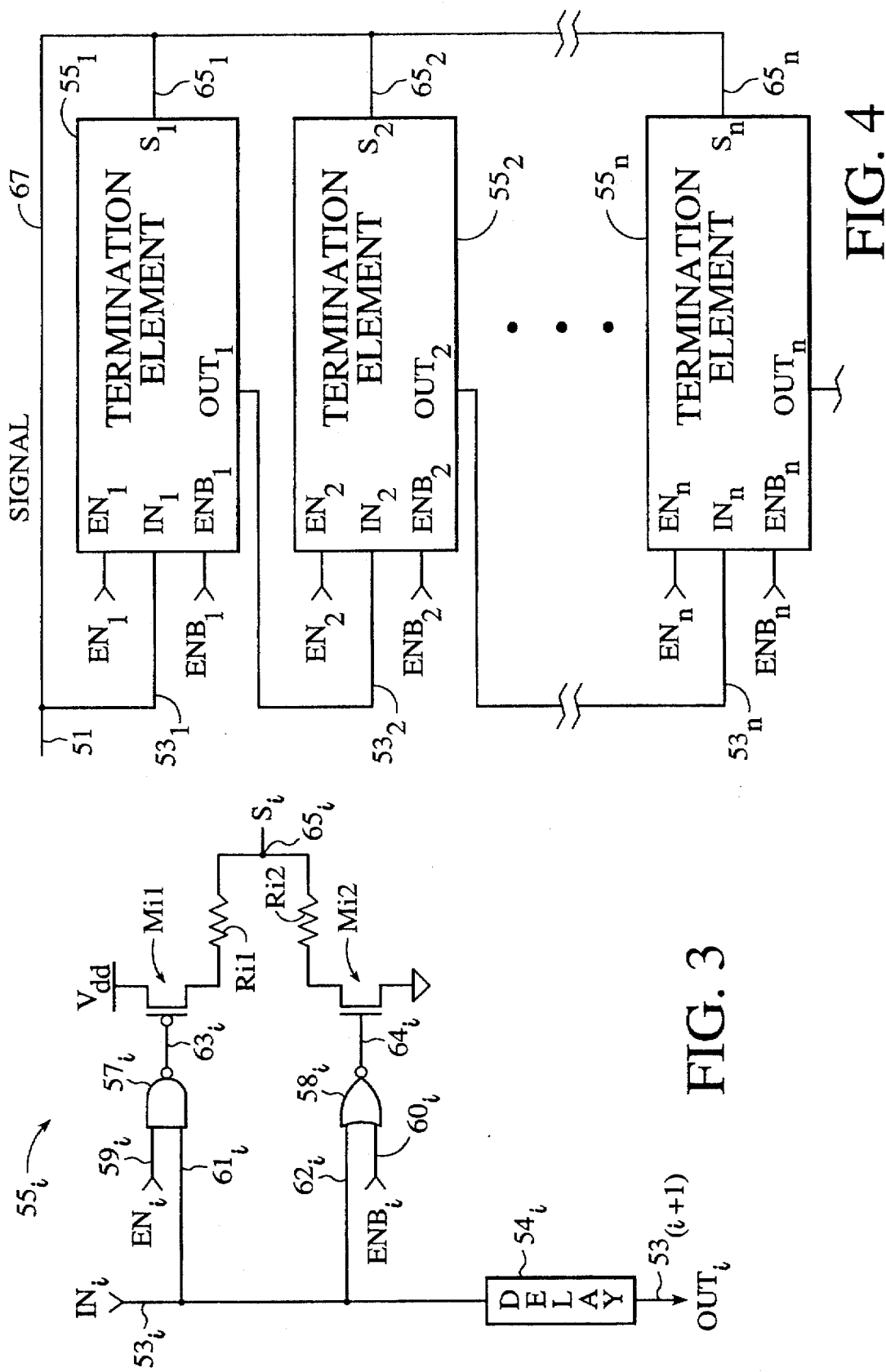
FIG. 3 is a schematic circuit diagram of an alternate termination element with programmable enable and disable for use in a termination circuit of the present invention.
FIG. 4 is a block level circuit diagram of an embodiment of the termination circuit of the present invention, where each delay element block comprises the alternate termination element of FIG. 3.

As also seen in FIG. 3, the termination element 55i may be selectively enabled (or disabled) by means of enabling signals $EN_i$ and $ENB_i$. This allows the termination circuit to be programmed to produce different termination impedances to match different transmission lines to their loads. In FIGS. 3 and 4, the termination circuit has an input 51 connected to an end of a transmission line, and a set of termination elements $55_1, 55_2, \ldots, 55_n$ (that is, $55_i$ for i=1 to n). Each termination element $55_i$ has an input $53_i$ providing an input signal $IN_i$ from the termination circuit's input 51 or from the output $OUT_{(i-1)}$ of the preceding termination element $55_{(i-1)}$. The input signal $IN_i$ on the input $53_i$ passes through a delay element $54_i$, such as a resistor, to the output $OUT_i$ to form the input $53_{(i+1)}$ for the next termination element $55_{(i+1)}$ in the chain. Thus, the first termination element $55_1$ receives the undelayed signal directly from the termination circuit input 51 through its input 53, while each succeeding termination element $55_2, \ldots, 55_n$ receives an increasingly delayed signal via the preceding termination element's output $OUT_1, OUT_2, \ldots, OUT_{n-1}$. Each termination element $55_i$ (i=1 to n) also has complementary enable inputs $EN_i$ and $ENB_i$. These enable signals are input via gate inputs $59_i$ and $60_i$ into respective NAND and NOR gates $57_i$ and $58_i$ of the termination element $55_i$. The NAND and NOR gates $57_i$ and $58_i$ also receive the input signal $IN_i$ on respective gate inputs $61_i$ and $62_i$. If $EN_i$ is high and $ENB_i$ is low, then the gates $57_i$ and $58_i$ supply the inverted input signal on gate outputs $63_i$ and $64_i$ to the respective p-channel and n-channel transistors Mi1 and Mi2. Hence, gates $57_i$ and $58_i$ replace the first inverter 35 of FIG. 2 and also allow enablement of the termination element $55_i$. If $EN_i$ is low and $ENB_i$ is high, both transistors Mi1 and Mi2 are shut off, isolating the output $S_i$ from both $V_{dd}$ and ground. The termination outputs $S_i, S_2, \ldots, S_n$ of the elements $55_1, 55_2, \ldots, 55_n$ are connected in parallel to a feedback line 67 leading to the input 51 of the circuit to form a latch.

Assuming that there are 12 termination elements $55_i$ (i=1 to 12), each providing an impedance value of 300 Ω, then by enabling different numbers of termination elements, the circuit can provide overall impedances in accord with the following table:

| Number of Elements Enabled | Termination Impedance | Number of Elements Enabled | Termination Impedance |
| --- | --- | --- | --- |
| 1 | 300 Ω | 7 | 42.8 Ω |
| 2 | 150 Ω | 8 | 37.5 Ω |
| 3 | 100 Ω | 9 | 33.3 Ω |
| 4 | 75 Ω | 10 | 30 Ω |
| 5 | 60 Ω | 11 | 27.3 Ω |
| 6 | 50 Ω | 12 | 25 Ω |

The termination circuit works well if the termination impedance matches the characteristic line impedance $Z_0$ to within ±20%, and preferably within ±10%. The programmable termination circuit of FIGS. 3 and 4 can thus be used to terminate transmission lines with characteristic impedances of 25 Ω≦75 Ω (4 to 12 elements enabled), plus a few additional impedance values $Z_0$ up to 300 Ω.

Figure 5:
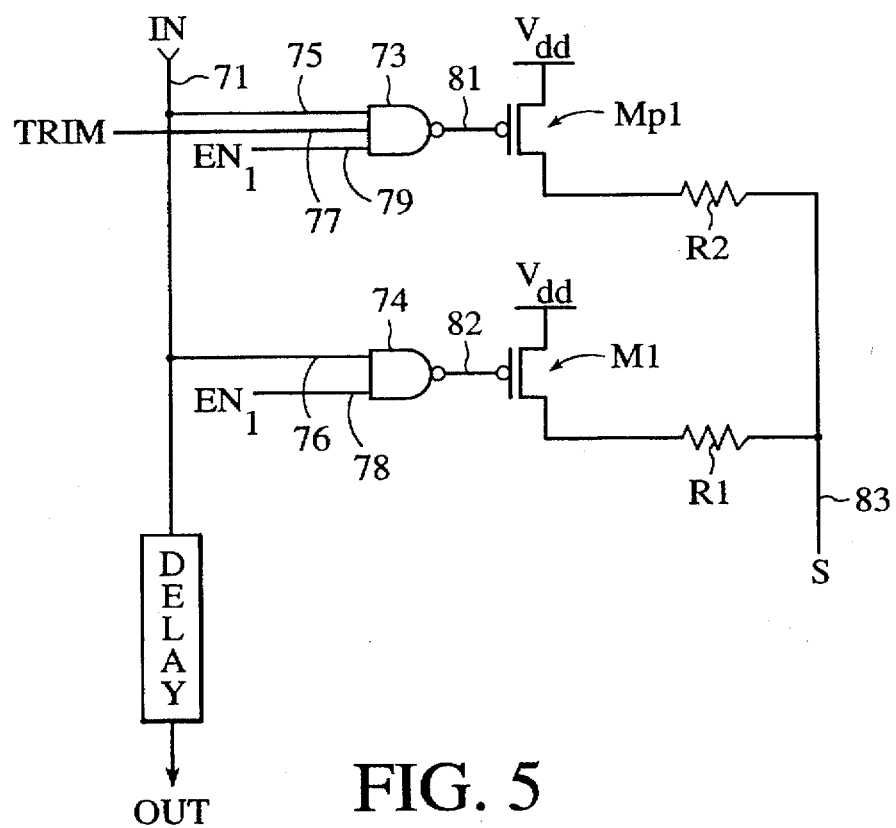
FIG. 5 is a schematic circuit diagram of a first termination element for the circuit of FIG. 4, with a trimming circuit.

Referring to FIG. 5, this impedance matching range can be covered only if the resistors are manufactured with a high degree of accuracy. However, in most semiconductor processes, the actual resistance values can vary by ±20%. To improve the number of usable manufactured circuits, a trimming circuit can be used. In the trimming circuit, each p-channel pull-up transistor M1 in each termination element has an associated p-channel trimming transistor Mp1. Both are connected between the voltage supply line $V_{dd}$ and the output node 83. Likewise, each n-channel pull-down transistor in each termination element would also have an associated n-channel trimming transistor. Both of these transistors would be connected between the output node 83 and ground. Alternatively, only the first termination element might have p-channel and n-channel trimming transistors. There could also be more than one trimming transistor associated with a given pull-up or pull-down transistor, each trimming transistor being responsive to its own individually selected trimming bit TRIM. In operation, both p-channel transistors M1 and Mp1 are driven by the same input signal IN on line 71 through respective inputs 75 and 76 to their own NAND gates 73 and 74. Likewise, both transistors M1 and Mp1 are enabled by the same enable signal $EN_1$. However, the trimming transistor Mp1 is further enabled or disabled by a trimming bit TRIM supplied to the third input of NAND gate 73. The outputs 81 and 82 of gates 73 and 74 drive the respective gates of transistors Mp1 and M1. For the n-channel pull-down and trimming transistors, both would be driven via NOR gates supplied with the input signal on input line 71, complementary enable signal $ENB_1$, and for the trimming transistor a complementary trimming bit TRIMB. In any case, the pull-up transistor M1 (or the pull-down transistor) has a first resistor R1 in series with it, as in the previous embodiment of FIG. 3, while the trimming transistor Mp1 has a second, somewhat larger resistor R2 in series with it. The first resistor R1 is selected so that the impedance is designed to be 10% larger than the nominal value, and the second resistor R2 is selected to reduce the impedance by 20% when active. This is found to be the case if the ratio R2/R1 is equal to 5. Then if the actual impedance in a manufactured part is greater than the designed value, the TRIM bit can be set high to activate the trimming transistor Mp1 and its associated second resistor R2, and thereby lower the actual impedance to within 10% of the nominal value. If the actual impedance in a manufactured part is less than the designed value, the TRIM bit is set low to deactivate the trimming transistor Mp1 and its current path through resistor R2, so that the actual impedance will be within 12% of the nominal value. This is illustrated in the following chart:

| Nominal | Design | Mfg. Variance | TRIM | Actual Impedance |
| --- | --- | --- | --- | --- |
| (1.0) × Z | (1.1) × Z | +20% | H | (1.1) × Z |
| (1.0) × Z | (1.1) × Z | +10% | H | (1.0) × Z |
| (1.0) × Z | (1.1) × Z | 0 | H | (0.9) × Z |
|  |  |  | L | (1.1) × Z |
| (1.0) × Z | (1.1) × Z | −10% | L | (0.99) × Z |
| (1.0) × Z | (1.1) × Z | −20% | L | (0.88) × Z |

Clearly with even more trimming bits, the tolerances in the actual product can be even further reduced.

I claim:

1. A dynamic termination circuit, comprising
   a termination circuit input connectable to an end of a transmission line to receive a signal therefrom,
   a plurality of delay elements connected in series to said termination circuit input, with an output provided after each delay element in said series,
   a plurality of termination elements with respective inputs connected to a different one of the termination circuit input and the outputs after the delay elements, respective outputs of the termination elements connected to a feedback line connected to the termination circuit input, each termination element including a first dynamic resistive path from a voltage supply line to said output of said termination element and a second dynamic resistive path from said output of said termination element to ground, each dynamic resistive path including a field-effect transistor responsive to a signal on said input of said termination element.

2. The circuit of claim 1 wherein said first dynamic resistive path comprises a first p-channel transistor and a first resistor, and said second dynamic resistive path comprises a second n-channel transistor and a second resistor, the transistors and resistors all being located in series between said voltage supply line and ground, said output of said termination element being connected to a node between said first and second resistors.

3. The circuit of claim 1 wherein a first p-channel transistor and a second n-channel transistor are connected in series between said voltage supply line and ground with a node therebetween, and wherein a resistor is connected between said node and said output of said termination element, whereby said first dynamic resistive path comprises said first p-channel transistor and said resistor and said second dynamic resistive path comprises said second p-channel transistor and the same said resistor.

4. The circuit of claim 1 wherein said termination circuit input comprises an inverter element with an inverter input connectable to said end of said transmission line and connected to said feedback line and with an inverter output connected to said series of delay elements and to a first of said termination elements.

5. The circuit of claim 1 wherein, for each said termination element, a pair of logic gates are connected between said input of that termination element and control gates of said field-effect transistors of said first and second dynamic resistive paths of that termination element, each logic gate including an enable input receiving a user-programmable enable signal for selectively enabling response of said field-effect transistors of that termination element to a signal received on said input of that termination element.

6. The circuit of claim 5 wherein said logic gates comprise a NAND gate connected to a p-channel transistor in said first dynamic resistive path and a NOR gate connected to an n-channel transistor in said second dynamic resistive path, the enable inputs of said respective NAND and NOR gates being logically complementary to one another.

7. The circuit of claim 1 wherein said delay elements comprise a series of resistors.

8. The circuit of claim 1 wherein, for at least one termination element, each dynamic resistive path of that element has a supplementary resistive current path connected in parallel to and associated with that dynamic resistive path to said respective voltage supply line or ground, each said supplementary resistive current path having a transistor responsive to a user-programmable TRIM bit of the termination circuit.

9. A programmable termination circuit, comprising a termination circuit input connectable to an end of a transmission line to receive a signal therefrom, and a plurality selectively enabled termination elements with respective inputs connected to receive said signal from said circuit input, respective outputs of the termination elements connected to a feedback line connected to said termination circuit input, each termination element including a first dynamic resistive path from a voltage supply line to said termination element output and a second dynamic resistive path from said termination element output to ground, each dynamic resistive path including a field-effect transistor with a control gate, each termination element also including a pair of logic gates connected between said input of that termination element and said control gates of said field-effect transistors in said respective first and second dynamic resistive paths, each logic gate having an enable input receiving a user-programmable enable signal for selectively enabling response of said field-effect transistors of that termination element to a signal received at said termination element input.

10. The circuit of claim 9 wherein said logic gates comprise a NAND gate connected to a p-channel transistor in said first dynamic resistive path and a NOR gate connected to an n-channel transistor in said second dynamic resistive path, the enable inputs of said respective NAND and NOR gates being logically complementary to one another.

11. The circuit of claim 9 wherein said first dynamic resistive path comprises a first p-channel transistor and a first resistor, and said second dynamic resistive path comprises a second n-channel transistor and a second resistor, the transistors and resistors all being located in series between said voltage supply line and ground, said output of said termination element being connected to a node between said first and second resistors.

12. The circuit of claim 9 wherein a first p-channel transistor and a second n-channel transistor are connected in series between said voltage supply line and ground with a node therebetween, and wherein a resistor is connected between said node and said output of said termination element, whereby said first dynamic resistive path comprises said first p-channel transistor and said resistor and said second dynamic resistive path comprises said second p-channel transistor and the same said resistor.

13. The circuit of claim 9 wherein, for at least one termination element, each dynamic resistive path of that element has a supplementary resistive current path connected in parallel to and associated with that dynamic resistive path to said respective voltage supply line or ground, each said supplementary resistive current path having a transistor response to a user-programmable TRIM bit of the termination circuit.

14. The circuit of claim 9 further comprising a plurality of delay elements connected in series to said termination circuit input, with an output provided after each delay element in said series, each termination element being connected at its input to a different one of the termination circuit input and the outputs after said delay elements.

15. The circuit of claim 14 wherein said delay elements comprise a series of resistors.

* * * * *